United States Patent
Ikarashi

(10) Patent No.: US 10,389,232 B2
(45) Date of Patent: Aug. 20, 2019

(54) BRIDGELESS POWER FACTOR CORRECTION CIRCUIT HAVING A SNUBBER CIRCUIT

(71) Applicant: TDK CORPORATION, Tokyo (JP)

(72) Inventor: Tomokazu Ikarashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/134,312

(22) Filed: Sep. 18, 2018

(65) Prior Publication Data

US 2019/0097526 A1    Mar. 28, 2019

(30) Foreign Application Priority Data

Sep. 22, 2017   (JP) ................................. 2017-182706

(51) Int. Cl.
   *H02M 1/42*   (2007.01)
   *H02M 1/34*   (2007.01)
   *H02M 7/217*  (2006.01)

(52) U.S. Cl.
   CPC .......... *H02M 1/4208* (2013.01); *H02M 1/34* (2013.01); *H02M 1/42* (2013.01); *H02M 1/4233* (2013.01); *H02M 7/217* (2013.01); *H02M 2001/346* (2013.01); *H02M 2001/348* (2013.01)

(58) Field of Classification Search
   CPC ............ H02M 1/42–1/4258; H02M 2001/342; H02M 2001/344; H02M 2001/346; H02M 2001/348; H02M 2001/0048; H02M 1/34
   See application file for complete search history.

(56) References Cited

U.S. PATENT DOCUMENTS

| | | | | |
|---|---|---|---|---|
| 6,411,535 | B1* | 6/2002 | Roux ................... | H02M 1/4225 363/124 |
| 2006/0208711 | A1* | 9/2006 | Soldano .............. | H02M 1/4225 323/225 |
| 2006/0220628 | A1* | 10/2006 | Soldano .............. | H02M 1/4233 323/282 |
| 2007/0006912 | A1* | 1/2007 | Kwon ................. | H02M 1/4208 136/256 |
| 2012/0212986 | A1* | 8/2012 | Minami .............. | H02M 1/4208 363/126 |

(Continued)

FOREIGN PATENT DOCUMENTS

JP       2010-154582       7/2010

*Primary Examiner* — Fred E Finch, III
*Assistant Examiner* — Rafael O. De León Domenech
(74) *Attorney, Agent, or Firm* — Greenblum & Bernstein, P.L.C.

(57) ABSTRACT

A bridgeless power factor correction circuit includes: a first leg composed of a series circuit with a first rectifier and a first switch; a second leg that is composed of a series circuit with a second rectifier and a second switch and is connected in parallel to the first leg; a smoothing capacitor connected in parallel to the first leg; a snubber circuit that is connected between a first connection point, which is located between the first rectifier and the first switch and is connected via a first inductor to one end of an AC power supply, and a second connection point, which is located between the second rectifier and the second switch and is connected via a second inductor to another end of the AC power supply; and a control circuit that executes on/off control of the first switch and the second switch.

2 Claims, 2 Drawing Sheets

(56) References Cited

U.S. PATENT DOCUMENTS

| | | | |
|---|---|---|---|
| 2013/0016545 A1* | 1/2013 | Xu | H02M 1/44 363/126 |
| 2013/0077365 A1* | 3/2013 | Chalermboon | H02M 1/4208 363/89 |
| 2014/0204635 A1* | 7/2014 | Umetani | H02M 1/4225 363/53 |
| 2015/0162822 A1* | 6/2015 | Ho | H02M 1/4208 363/89 |

* cited by examiner

F I G. 1
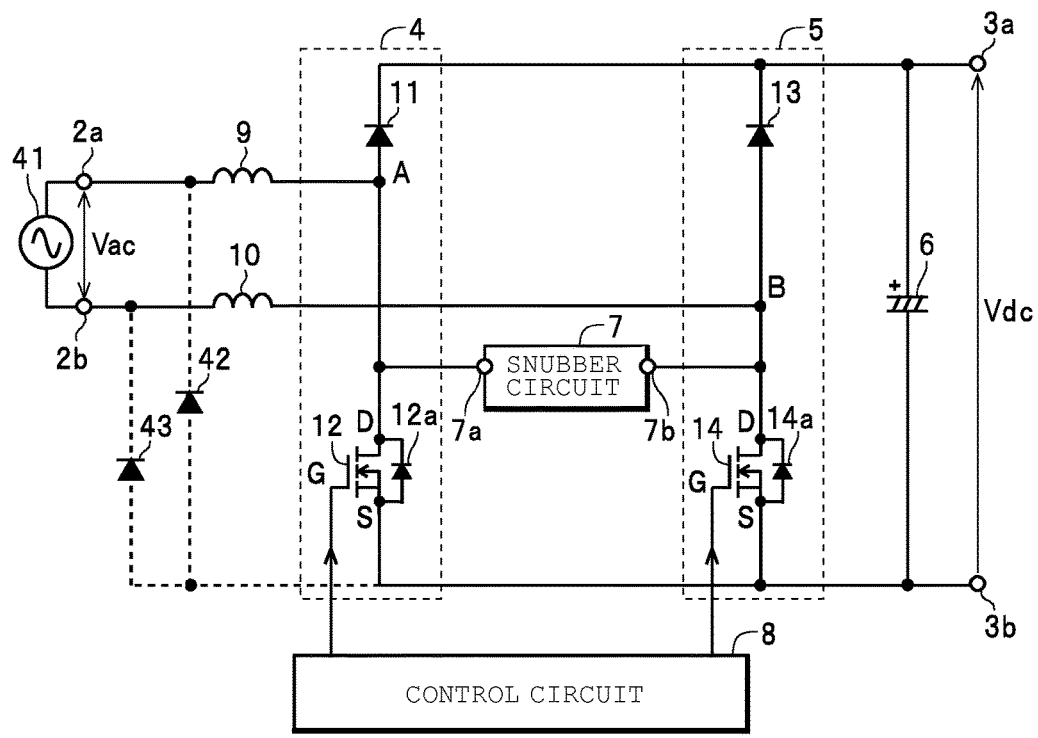
F I G. 2
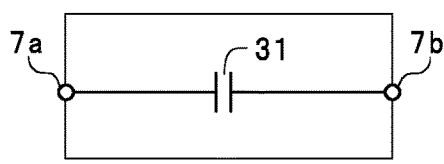

FIG. 4          PRIOR ART

BRIDGELESS POWER FACTOR CORRECTION CIRCUIT HAVING A SNUBBER CIRCUIT

FIELD OF THE INVENTION

The present invention relates to a bridgeless power factor correction circuit.

DESCRIPTION OF THE RELATED ART

A power factor correction circuit (AC-DC converter) disclosed in Patent Literature 1 (Japanese Laid-Open Patent Publication No. 2010-154582) is known as a basic example of this type of bridgeless power factor correction circuit (hereinafter also simply referred to as the "power factor correction circuit"). As depicted in FIG. 4, this power factor correction circuit 51 includes: a main switching circuit 58 formed by connecting two vertical arms (also referred to as "legs") 56 and 57, in each of which a rectifier 52 or 53 (here, as one example, diodes) and a main switch 54 or 55 (here, as one example, MOSFETs) are connected in series, in parallel; snubber capacitors 59 and 60 that are connected in parallel to the main switches 54 and 55 respectively; diodes 61 and 62 that are connected in inverse parallel to the main switches 54 and 55 respectively; an AC power supply 65 that is connected via smoothing reactors (inductors) 63 and 64 to series connection points (which serve as the AC terminals of the converter) A and B on the two vertical arms 56 and 57 and outputs an AC voltage Vac; and a smoothing capacitor 67 that is connected in parallel across both ends of the main switching circuit 58 that serve as the DC terminals (output terminals) 66a and 66b of the converter where the DC voltage Vdc is outputted. The power factor correction circuit 51 also includes a control means (or "control circuit") 68 that performs on/off control of the main switches 54 and 55. During a half cycle of the AC voltage Vac outputted from the AC power supply 65, the control means 68 fixes one of the main switches 54 and 55 in an on state and has the other of the main switches 54 and 55 turn on and off.

SUMMARY OF THE INVENTION

However, with the power factor correction circuit described above, although snubber capacitors are separately connected in parallel to each of the main switches that construct the two vertical arms (or "legs"), for this type of power factor correction circuit, it is desirable to reduce the overall mounting area of the snubber capacitors (snubber circuits).

The present invention was conceived in response to the demand described above and has a principal object of providing a bridgeless power factor correction circuit capable of reducing the overall mounting area of snubber circuits that are connected to switches.

To achieve the stated object, a bridgeless power factor correction circuit according to the present invention comprises: a first leg composed of a series circuit with a first rectifier and a first switch; a second leg that is composed of a series circuit with a second rectifier and a second switch and is connected in parallel to the first leg; a smoothing capacitor connected in parallel to the first leg; a snubber circuit that is connected between a first connection point, which is located between the first rectifier and the first switch in the first leg and is connected via a first inductor to one end of an AC power supply, and a second connection point, which is located between the second rectifier and the second switch in the second leg and is connected via a second inductor to another end of the AC power supply; and a control circuit that executes on/off control of the first switch and the second switch.

With this bridgeless power factor correction circuit, as one example, in a period where the AC voltage outputted from the AC power supply has positive polarity, the control circuit executes control that causes the first switch to perform switching operations (that is, on/off operations) while executing control so that the second switch maintains a constantly on state. During this time, a state that is equivalent to the snubber circuit being connected in parallel via the second switch that is constantly on to the first switch is maintained. Also, in a period where the AC voltage outputted from the AC power supply has negative polarity, the control circuit executes control that causes the second switch to perform switching operations (that is, on/off operations) while executing control so that the first switch maintains a constantly on state. During this time, a state that is equivalent to the snubber circuit being connected in parallel via the first switch that is constantly on to the second switch is maintained. Accordingly, since the above bridgeless power factor correction circuit is configured so that a single snubber circuit that is connected between the first and second connection points is shared by the switches, compared to a configuration where separate snubber circuits are connected in parallel to the switches, it is possible to reduce the overall mounting area of the snubber circuits.

Also, in the bridgeless power factor correction circuit according to the present invention, another snubber circuit is not connected in parallel to the first switch or to the second switch. Accordingly, with the above bridgeless power factor correction circuit, compared to a configuration where separate snubber circuits are connected in parallel to the switches, it is possible to reduce the overall mounting area of the snubber circuits to half.

It should be noted that the disclosure of the present invention relates to a content of Japanese Patent Application 2017-182706 that was filed on 22 Sep. 2017 and the entire content of which is herein incorporated by reference.

BRIEF DESCRIPTION OF THE DRAWINGS

These and other objects and features of the present invention will be explained in more detail below with reference to the attached drawings, wherein:

FIG. 1 is a block diagram depicting the configuration of a power factor correction circuit 1;

FIG. 2 is a circuit diagram of one example of a snubber circuit 7;

FIG. 4 is a block diagram depicting the basic configuration of a bridgeless power factor correction circuit 51.

DESCRIPTION OF THE PREFERRED EMBODIMENTS

Figure 3:
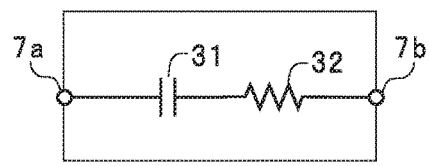
FIG. 3 is a circuit diagram of another example of a snubber circuit 7.
Figure 3:
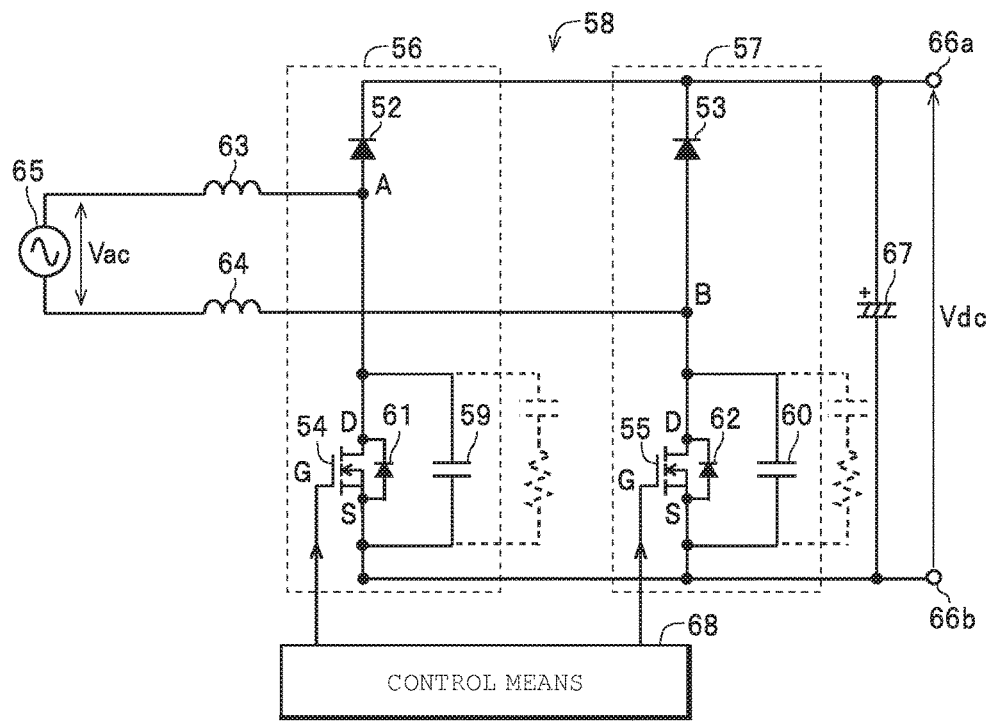

Preferred embodiments of a bridgeless power factor correction circuit will now be described with reference to the attached drawings.

The configuration of a bridgeless power factor correction circuit 1 (or hereinafter simply "power factor correction circuit 1") will now be described with reference to FIG. 1 as one example of a bridgeless power factor correction circuit according to the present invention. The power factor correction circuit 1 includes a pair of input terminals 2a and 2b (hereinafter referred to simply as the "input terminals 2" when no distinction is made), a pair of output terminals 3a and 3b (hereinafter referred to simply as the "output terminals 3" when no distinction is made), a first leg 4, a second leg 5, a smoothing capacitor 6, a snubber circuit 7, a control circuit 8, a first inductor 9, and a second inductor 10. The power factor correction circuit 1 is configured to convert an AC voltage Vac inputted across the input terminals 2 to a DC voltage Vdc which is outputted across the output terminals 3.

The first leg 4 is constructed of a series circuit with a first rectifier 11 and a first switch (or "main switch") 12. As one example in the present embodiment, the first rectifier 11 is constructed of a diode (and is hereinafter referred to as the "diode 11"), the first switch 12 is constructed of an n-type MOSFET (and is hereinafter referred to as the "FET 12"), and the series circuit mentioned above is constructed by connecting the anode terminal of the diode 11 and the drain electrode of the FET 12. A diode 12a is also connected in parallel to the FET 12. The diode 12a may be constructed of a separate rectifier to the FET 12, but when the first switch includes a parasitic diode (or "body diode") like the FET 12, the diode 12a may be constructed of this parasitic diode.

The second leg 5 is constructed of a series circuit with a second rectifier 13 and a second switch (or "main switch") 14. As one example in the present embodiment, the second rectifier 13 is constructed of a diode (and is hereinafter referred to as the "diode 13"), the second switch 14 is constructed of an n-type MOSFET (and is hereinafter referred to as the "FET 14"), and the series circuit mentioned above is constructed by connecting the anode terminal of the diode 13 and the drain electrode of the FET 14. A diode 14a is also connected in parallel to the FET 14. The diode 14a may be constructed of a separate rectifier to the FET 14, but when the second switch includes a parasitic diode (or "body diode") like the FET 14, the diode 14a may be constructed of this parasitic diode.

The first leg 4 and the second leg 5 are connected in parallel by connecting the cathode terminals of the diodes 11 and 13 together and connecting the source electrodes of the FETs 12 and 14 together.

The smoothing capacitor 6 is connected in parallel to both the first leg 4 and the second leg 5 by connecting one end of the smoothing capacitor 6 to both the cathode terminal of the diode 11 that constructs the first leg 4 and the cathode terminal of the diode 13 that constructs the second leg 5 and connecting the other end of the smoothing capacitor 6 to both the source electrode of the FET 12 that constructs the first leg 4 and the source electrode of the FET 14 that constructs the second leg 5. Although a configuration where a polar capacitor such as an electrolytic capacitor is used as the smoothing capacitor 6 is used in the present embodiment as depicted in FIG. 1, the present invention is not limited to this and it is also possible to use a configuration that uses a non-polar capacitor, such as a film capacitor or a ceramic capacitor.

One end (or "first end") of an AC power supply 41 that outputs the AC voltage Vac across both ends is connected to the input terminal 2a and the other end of the AC power supply 41 is connected to the input terminal 2b. The input terminal 2a (that is, one end of the AC power supply 41) is connected via the first inductor 9 to a first connection point A between the diode 11 and the FET 12 in the first leg 4 (that is, to the anode terminal of the diode 11 and the drain electrode of the FET 12). Similarly, the input terminal 2b (that is, the other end of the AC power supply 41) is connected via the second inductor 10 to a second connection point B between the diode 13 and the FET 14 in the second leg 5 (that is, to the anode terminal of the diode 13 and the drain electrode of the FET 14). As one example in the present embodiment, the inductance values of the inductors 9 and 10 are set equal.

The snubber circuit 7 has one end 7a connected to the first connection point A and another end 7b connected to the second connection point B so that the snubber circuit 7 is connected between the first connection point A and the second connection point B. More specifically, the snubber circuit 7 is configured as one of a C snubber circuit composed of only a capacitor 31 as depicted in FIG. 2 and an RC snubber circuit composed of a series circuit with the capacitor 31 and a resistor 32 as depicted in FIG. 3. In other words, the snubber circuit 7 is a snubber circuit that includes a capacitor.

The control circuit 8 is constructed for example of a computer or a DSP (Digital Signal Processor) and executes on/off control of the FETs 12 and 14. In more detail, while detecting the polarity of the AC voltage Vac (as examples, whether the input terminal 2a has positive polarity having a positive voltage with the potential of the input terminal 2b as a reference or whether the input terminal 2a has negative polarity having a negative voltage with the potential of the input terminal 2b as a reference) and the voltage value of the DC voltage Vdc, the control circuit 8 executes control during a period where the AC voltage Vac has positive polarity so that the FET 14 of the second leg 5 maintains a constantly on state and the FET 12 of the first leg 4 performs switching operations while changing the duty ratio in keeping with a detected voltage value of the DC voltage Vdc. On the other hand, the control circuit 8 executes control during a period where the AC voltage Vac has negative polarity so that conversely the FET 12 of the first leg 4 maintains a constantly on state and the FET 14 of the second leg 5 performs switching operations while changing the duty ratio in keeping with the detected voltage value of the DC voltage Vdc.

The operation of the power factor correction circuit 1 will be described next.

First, during a period where the AC voltage Vac has positive polarity (that is, during the positive half cycle of the AC voltage Vac), as described above the control circuit 8 executes control so that the FET 12 performs switching operations (that is, on/off operations) while executing control so that the FET 14 maintains a constantly on state. By doing so, when the FET 12 is on, a current flows on a path from one end of the AC power supply 41 via the input terminal 2a, the first inductor 9, the first connection point A, the FET 12, the FET 14 (or the diode 14a), the second connection point B, the second inductor 10, and the input terminal 2b to the other end of the AC power supply 41, which causes energy to accumulate in the inductors 9 and 10. On the other hand, when the FET 12 is off, a current flows on a path from one end of the AC power supply 41 via the input terminal 2a, the first inductor 9, the first connection point A, the diode 11, the smoothing capacitor 6, the FET 14 (or the diode 14a), the second connection point B, the second inductor 10, and the input terminal 2b to the other end of the AC power supply 41, so that energy that has accumulated in the inductors 9 and 10 is supplied together with the energy from the AC power supply 41 to the smoothing capacitor 6 (thereby generating the DC voltage Vdc).

While this control over the FETs 12 and 14 is being executed, a state where the other end 7b of the snubber circuit 7 is connected via the FET 14 that is constantly on to the source electrode of the FET 12 is maintained. By doing so, a state that is equivalent to the snubber circuit 7 being connected in parallel to the FET 12 via the FET 14 is maintained. Accordingly, since it is possible for the snubber circuit 7 to suppress dv/dt for the source-drain voltage of the FET 12 that is performing switching operations, it is possible to reduce the noise that is produced due to the FET 12 performing the switching operations.

Next, during a period where the AC voltage Vac has negative polarity (that is, during the negative half cycle of the AC voltage Vac), as described above the control circuit 8 executes control so that the FET 14 performs switching operations (that is, on/off operations) while executing control so that the FET 12 maintains a constantly on state. By doing so, when the FET 14 is on, a current flows on a path from the other end of the AC power supply 41 via the input terminal 2b, the second inductor 10, the second connection point B, the FET 14, the FET 12 (or the diode 12a), the first connection point A, the first inductor 9, and the input terminal 2a to the first end of the AC power supply 41, which causes energy to accumulate in the inductors 9 and 10. On the other hand, when the FET 14 is off, a current flows on a path from the other end of the AC power supply 41 via the input terminal 2b, the second inductor 10, the second connection point B, the diode 13, the smoothing capacitor 6, the FET 12 (or the diode 12a), the first connection point A, the first inductor 9, and the input terminal 2a to the first end of the AC power supply 41, so that energy that has accumulated in the inductors 9 and 10 is supplied together with the energy from the AC power supply 41 to the smoothing capacitor 6 (thereby generating the DC voltage Vdc).

While this control over the FETs 12 and 14 is being executed, a state where the first end 7a of the snubber circuit 7 is connected via the FET 12 that is constantly on to the source electrode of the FET 14 is maintained. By doing so, a state that is equivalent to the snubber circuit 7 being connected in parallel to the FET 14 via the FET 12 is maintained. Accordingly, since it is possible for the snubber circuit 7 to suppress dv/dt for the source-drain voltage of the FET 14 that is performing switching operations, it is possible to reduce the noise that is produced due to the FET 14 performing the switching operations.

In this way, with the power factor correction circuit 1, during the period where the AC voltage Vac has positive polarity, the snubber circuit 7 is connected in parallel to the FET 12 and during the period where the AC voltage Vac has negative polarity, the snubber circuit 7 is connected in parallel to the FET 14. That is, the power factor correction circuit 1 is configured so that a single snubber circuit 7 is shared between the FETs 12 and 14. This means that according to the power factor correction circuit 1, compared to the configuration of the typical power factor correction circuit 51 that is described in the related art (that is, a configuration where the snubber capacitors 59 and 60 are connected in parallel as snubber circuits to the main switches (FETs) 54 and 55 as depicted in FIG. 4), when the snubber circuit 7 is constructed of only a capacitor (that is, the configuration depicted in FIG. 2) in the same way as the snubber circuits of the power factor correction circuit 51, it is sufficient as the snubber circuit 7 to install one capacitor 31 with the same capacity and the same withstand voltage as the snubber capacitors 59 and 60, which means that it is possible to reduce the overall mounting area of the snubber circuit 7 connected to the FETs 12 and 14 (in more detail, to reduce the mounting area by half).

In the basic configuration of the typical power factor correction circuit 51 depicted in FIG. 4, it is also possible to replace the snubber capacitors 59 and 60 with snubber circuits that are each constructed as depicted by the broken lines of a series circuit with a capacitor and a resistor and are respectively connected in parallel to the main switches (FETs) 54 and 55. In this case also, according to the power factor correction circuit 1, by using a snubber circuit 7 of the configuration depicted in FIG. 3, compared to the typical power factor correction circuit where separate snubber circuits are respectively connected in parallel to the main switches (FETs) 54 and 55, it is possible to reduce the overall mounting area of the snubber circuit 7 connected to the FETs 12 and 14 (in more detail, to reduce the mounting area to half).

Note that although the power factor correction circuit 1 described above uses a most preferred configuration where the snubber circuit 7 is connected only between the first connection point A of the first leg 4 and the second connection point B of the second leg 5 (that is, a configuration capable of reducing the mounting area to half) in place of a configuration where snubber circuits are connected in parallel to the FETs 12 and 14, the present invention is not limited to this configuration. As one example, while using the configuration of the typical power factor correction circuit 51 described above (that is, a configuration where the snubber capacitors 59 and 60 as snubber circuits are connected in parallel to the main switches 54 and 55, respectively, as depicted in FIG. 4), it is also possible to additionally connect the snubber circuit 7 (that is, a snubber circuit of the configuration depicted in FIG. 2 or FIG. 3) between the series connection points A and B in order to increase the effective capacities of the snubber capacitors 59 and 60. According to a power factor correction circuit of this configuration, compared to a configuration where the respective capacities of the snubber capacitors 59 and 60 are increased (for example, a configuration where the capacities are increased by further connecting a capacitor (or a series circuit composed of a capacitor and a resistor), not illustrated, in parallel), it is possible to reduce the additional number of capacitors (or series circuits composed of a capacitor and a resistor) from two to one. That is, it is possible to reduce the overall mounting area of the snubber circuits.

Also, although the power factor correction circuit 1 described above uses a configuration that uses diodes as the first rectifier 11 and the second rectifier 13, in place of this configuration, although not illustrated, it is possible to construct the first rectifier 11 and the second rectifier 13 of FETs that are subjected to synchronous rectification control by the control circuit 8.

With the power factor correction circuit 1, as depicted by the broken lines in FIG. 1, it should be obvious that it is also possible to use a configuration where a diode 42 is connected with the polarity indicated in the drawing between the input terminal 2a and the output terminal 3b (and the source electrodes of the FETs 12 and 14) and a diode 43 is connected with the polarity indicated in the drawing between the input terminal 2b and the output terminal 3b.

In the embodiment described above, although the control circuit 8 executes control in keeping with the polarity of the AC voltage Vac so that one FET out of the FETs 12 and 14 is kept constantly on and the other FET performs switching operations (as one example, when the AC voltage Vac has positive polarity, the FET 14 is kept constantly on and the FET 12 performs switching operations), the present invention is not limited to this. As one example, it is also possible to execute control in keeping with the polarity of the AC voltage Vac so that the other FET performs switching operations while one FET out of the FETs 12 and 14 is kept constantly off (as one example, when the AC voltage Vac has positive polarity, the FET 14 is kept constantly off and the FET 12 performs switching operations). With a configuration where one FET is kept constantly off, the recovery time of the parasitic diode of the FETs used as the FETs 12 and 14 is used so that it is possible for the snubber circuit 7 to operate as a snubber in the same way as in a configuration where one of the FETs is controlled to be constantly on (a synchronous rectification configuration). That is, even with a configuration that performs control to keep one FET constantly off in keeping with the polarity of the AC voltage Vac, the FET that is in the off state will be shorted due to conduction by the internal parasitic diode, so that in the same way as a synchronous rectification configuration that performs control to keep one FET constantly on in keeping with the polarity of the AC voltage Vac, the snubber circuit 7 will be effectively connected in parallel across the drain-source of the other FET and operate as a snubber.

For the reason given above, due to the control circuit 8 controlling the FET 12 and the FET 14 to perform (on/off) switching operations according to power factor correction control, even if one FET is not kept constantly on or constantly off in keeping with the polarity of the AC voltage Vac, by using the recovery time of the parasitic diodes of the FETs in use, one of the FETs will be shorted due to conduction through the parasitic diode inside the FET. This produces the equivalent of the snubber circuit 7 being connected in parallel across the drain-source of the other FET.

What is claimed is:

1. A bridgeless power factor correction circuit having a snubber circuit, comprising:
   a first leg composed of a series circuit with a first rectifier and a first switch;
   a second leg that is composed of a series circuit with a second rectifier and a second switch and is connected in parallel to the first leg;
   a smoothing capacitor connected in parallel to the first leg;
   a snubber circuit that is a two-terminal circuit having only two terminal ends comprising only first and second terminal ends, the two-terminal circuit comprising solely a capacitor or solely a series circuit having a capacitor and a resistor,
      the first terminal end of the two-terminal circuit being connected solely to a first connection point, which is located between the first rectifier and the first switch in the first leg and is connected via a first inductor to one end of an AC power supply, and
      the second terminal end of the two-terminal circuit being connected solely to a second connection point, which is located between the second rectifier and the second switch in the second leg and is connected via a second inductor to another end of the AC power supply; and
   a control circuit that executes on/off control of the first switch and the second switch.

2. The bridgeless power factor correction circuit according to claim 1, wherein the snubber circuit comprises a single snubber circuit connected between the first and second connection points.

* * * * *